US007817796B1

(12) United States Patent
Clippinger et al.

(10) Patent No.: US 7,817,796 B1
(45) Date of Patent: Oct. 19, 2010

(54) COORDINATING WORK ASSIGNMENTS FOR CONTACT CENTER AGENTS

(75) Inventors: Joyce A. Clippinger, Woodinville, WA (US); David C. Mullen, Newcastle, WA (US); Bridget Rosen, Brier, WA (US)

(73) Assignee: Avaya Inc., Basking Ridge, NJ (US)

( * ) Notice: Subject to any disclaimer, the term of this patent is extended or adjusted under 35 U.S.C. 154(b) by 1428 days.

(21) Appl. No.: 11/116,913

(22) Filed: Apr. 27, 2005

(51) Int. Cl.
*H04M 3/00* (2006.01)

(52) U.S. Cl. .......................... 379/266.01; 379/265.12; 379/266.07

(58) Field of Classification Search .. 379/265.01–266.1
See application file for complete search history.

(56) References Cited

U.S. PATENT DOCUMENTS

| 4,163,124 A | 7/1979 | Jolissaint |
| 4,567,323 A | 1/1986 | Lottes et al. |

(Continued)

FOREIGN PATENT DOCUMENTS

| CA | 2143198 | 1/1995 |
| CA | 2174762 | 6/1995 |

(Continued)

OTHER PUBLICATIONS

U.S. Appl. No. 09/420,912, Ford.

(Continued)

*Primary Examiner*—Fan Tsang
*Assistant Examiner*—Assad Mohammed
(74) *Attorney, Agent, or Firm*—Sheridan Ross P.C.

(57) ABSTRACT

A method and system for assigning tasks to contact center agents is disclosed, wherein an automatic call distributor (ACD) used for distributing incoming contact center calls to the agents is used to distribute other tasks to the agents. When an agent task (different from handling an incoming call) is determined, a corresponding "proxy" telephone call is generated from within the contact center to a PBX to assign an agent to the task. The ACD processes the proxy call substantially identically to any other incoming call requesting an agent's services. A proxy call has as its destination phone number the directory number of a call group used in selecting an appropriate agent for performing the task. The proxy call phone number additionally identifies the location of detailed information about the task. When a proxy call is routed by the ACD to the selected agent's worksite, the called phone number is used to fetch the detailed task information, and the selected agent is made unavailable to the ACD for further incoming calls. The agent is made available for taking contact center incoming calls when the task is completed or preempted.

25 Claims, 5 Drawing Sheets

U.S. PATENT DOCUMENTS

| | | |
|---|---|---|
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,402,474 A * | 3/1995 | Miller et al. ............. 379/93.12 |
| 5,436,965 A | 7/1995 | Grossman et al. |
| 5,444,774 A | 8/1995 | Friedes |
| 5,467,391 A * | 11/1995 | Donaghue et al. ...... 379/266.08 |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Ellert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,216,166 B1 * | 4/2001 | Zheng et al. ................. 709/238 |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,324,282 B1 * | 11/2001 | McIllwaine et al. .... 379/265.06 |
| 6,353,810 B1 | 3/2002 | Petrushin |
| 6,356,632 B1 | 3/2002 | Foster et al. |
| 6,366,668 B1 | 4/2002 | Borst et al. |
| 6,373,857 B1 * | 4/2002 | Ma ........................ 370/475 |
| 6,389,028 B1 | 5/2002 | Bondarenko et al. |
| 6,389,132 B1 * | 5/2002 | Price ..................... 379/265.01 |
| 6,389,400 B1 | 5/2002 | Bushey et al. |
| 6,400,817 B1 * | 6/2002 | Su et al. ................. 379/201.05 |
| 6,424,709 B1 | 7/2002 | Doyle et al. |
| 6,426,950 B1 | 7/2002 | Mistry |
| 6,427,137 B2 | 7/2002 | Petrushin |

| | | | |
|---|---|---|---|
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,526,135 B1* | 2/2003 | Paxson | 379/218.01 |
| 6,535,600 B1 | 3/2003 | Fisher et al. | |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,628,777 B1* | 9/2003 | McIllwaine et al. | 379/265.01 |
| 6,650,748 B1 | 11/2003 | Edwards et al. | |
| 6,704,409 B1 | 3/2004 | Dilip et al. | |
| 6,707,903 B2 | 3/2004 | Burok et al. | |
| 6,744,877 B1* | 6/2004 | Edwards | 379/265.02 |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,804,346 B1* | 10/2004 | Mewhinney | 379/265.1 |
| 7,046,789 B1* | 5/2006 | Anderson et al. | 379/265.01 |
| 7,092,509 B1* | 8/2006 | Mears et al. | 379/266.01 |
| 7,181,522 B2* | 2/2007 | Shah et al. | 709/224 |
| 7,263,183 B1* | 8/2007 | Klein et al. | 379/265.09 |
| 7,313,103 B2* | 12/2007 | Cox et al. | 370/285 |
| 7,406,515 B1* | 7/2008 | Joyce et al. | 709/224 |
| 7,561,520 B2* | 7/2009 | Holloway et al. | 370/235 |
| 2001/0007589 A1* | 7/2001 | Uppaluru et al. | 379/211.02 |
| 2001/0056349 A1 | 12/2001 | St. John | |
| 2002/0002460 A1 | 1/2002 | Pertrushin | |
| 2002/0002464 A1 | 1/2002 | Pertrushin | |
| 2002/0010587 A1 | 1/2002 | Pertrushin | |
| 2002/0118816 A1 | 8/2002 | Flockhart et al. | |
| 2002/0181692 A1 | 12/2002 | Flockhart et al. | |
| 2002/0194002 A1 | 12/2002 | Pertrushin | |
| 2003/0123642 A1 | 7/2003 | Alvarado et al. | |
| 2003/0152212 A1 | 8/2003 | Burok et al. | |
| 2003/0174830 A1 | 9/2003 | Boyer et al. | |
| 2003/0177017 A1 | 9/2003 | Boyer et al. | |
| 2003/0177231 A1 | 9/2003 | Flockhart et al. | |
| 2004/0057569 A1* | 3/2004 | Busey et al. | 379/265.09 |
| 2004/0203878 A1 | 10/2004 | Thomson | |

FOREIGN PATENT DOCUMENTS

| | | |
|---|---|---|
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 09/416,737, Flockhart et al.
U.S. Appl. No. 10/098,824, Flockhart et al.
U.S. Appl. No. 10/673,118, Flockhart et al.
U.S. Appl. No. 10/673,115, Flockhart et al.
U.S. Appl. No. 10/673,103, Flockhart et al.
U.S. Appl. No. 10/673,105, Flockhart et al.
U.S. Appl. No. 10/683,039, Flockhart et al.
U.S. Appl. No. 10/099,144, Boyer et al.
U.S. Appl. No. 10/815,534, Flockhart et al.
U.S. Appl. No. 10/815,566, Kiefhaber et al.
U.S. Appl. No. 10/815,584, Kiefhaber et al.
U.S. Appl. No. 10/861,193, Flockhart et al.
U.S. Appl. No. 10/891,346, Flockhart et al.
U.S. Appl. No. 10/946,638, Flockhart et al.
U.S. Appl. No. 10/000,686, Flockhart et al.
U.S. Appl. No. 09/420,912, filed Oct. 20, 1999, Ford.
U.S. Appl. No. 09/416,737, filed Oct. 13, 1999, Flockhart et al.
U.S. Appl. No. 10/098,824, filed Mar. 15, 2002, Flockhart et al.
U.S. Appl. No. 10/673,118, filed Sep. 26, 2003, Flockhart et al.
U.S. Appl. No. 10/673,115, filed Sep. 26, 2003, Flockhart et al.
U.S. Appl. No. 10/673,103, filed Sep. 26, 2003, Flockhart et al.
U.S. Appl. No. 10/673,105, filed Sep. 26, 2003, Flockhart et al.
U.S. Appl. No. 10/683,039, filed Oct. 10, 2003, Flockhart et al.
U.S. Appl. No. 10/099,144, filed Mar. 15, 2002, Boyer et al.
U.S. Appl. No. 10/815,534, filed Mar. 31, 2004, Flockhart et al.
U.S. Appl. No. 10/815,566, filed Mar. 31, 2004, Kiefhaber et al.
U.S. Appl. No. 10/815,584, filed Mar. 31, 2004, Kiefhaber et al.
U.S. Appl. No. 10/861,193, filed Jun. 3, 2004, Flockhart et al.
U.S. Appl. No. 10/891,346, filed Jul. 13, 2004, Flockhart et al.
U.S. Appl. No. 10/946,638, filed Sep. 20, 2004, Flockhart et al.
U.S. Appl. No. 10/000,686, filed Oct. 31, 2001, Flockhart et al.
"Product Features," *Guide to Call Center Automation*, Brock Control Systems, Inc., Activity Managers Series™, Section 5—Company B120, p. 59, 1992.
"Product Features," *Guide to Call Center Automation*, CRC Information Systems, Inc., Tel-ATHENA, Section 5—Company C520, p. 95, 1992.
Dawson, "NPRI's Powerguide, Software Overview" *Call Center Magazine* (Jun. 1993), p. 85.
"Applications, NPRI's Predictive Dialing Package," *Computer Technology* (Fall 1993), p. 86.
"Call Center Software You Can't Outgrow," *Telemarketing®* (Jul. 1993), p. 105.
"VAST™, Voicelink Application Software for Teleservicing®," *System Manager User's Guide*, Digital Systems (1994), pp. ii, vii-ix, 1-2, 2-41 through 2-77.
GEOTEL Communications Corporation Web site printout entitled "Intelligent CallRouter" Optimizing the Interaction Between Customers and Answering Resources. 6 pages.
L.F. Lamel and J.L. Gauvain, Language Identification Using Phone-Based Acoustic Likelihood, ICASSP-94, 4 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
U.S. Appl. No. 09/235,065, Denton et al.
U.S. Appl. No. 09/247,893, Edwards et al.
U.S. Appl. No. 09/264,497, Edwards.
U.S. Appl. No. 09/756,955, Flockhart et al.
U.S. Appl. No. 09/235,065, filed Jan. 21, 1999, Denton et al.
U.S. Appl. No. 09/247,893, filed Feb. 10, 1999, Edwards et al.
U.S. Appl. No. 09/264,497, filed Mar. 8, 1999, Edwards.
U.S. Appl. No. 09/756,955, filed Jan. 9, 2001, Flockhart et al.

Stevenson et al.; "Name Resolution in Network and Systems Management Environments"; http://netman.cit.buffalo.edu/Doc/DStevenson/NR-NMSE.html; 16 pages.

Doo-Hyun Kim et al. "Collaborative Multimedia Middleware Architecture and Advanced Internet Call Center," Proceedings at the International Conference on Information Networking (Jan. 31, 2001), pp. 246-250.

"When Talk Isn't Cheap," Sm@rt Reseller, v. 3, n. 13 (Apr. 3, 2000), p. 50.

"eGain's Commerce 2000 Platform Sets New Standard for eCommerce Customer Communications," Business Wire (Nov. 15, 1999)., 3 pages.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 8 pages.

Presentation by Victor Zue, The MIT Ox90ygen Project, MIT Laboratory for Computer Science (Apr. 25-26, 2000) 9 pages.

MIT Project Oxygen, Pervasive, Human-Centered Computing (MIT Laboratory for Computer Science) (Jun. 2000) pp. 1-15.

Examiner's Refusal Decision dated Jul. $4^{th}$, 2005 in Japanese Patent App. No. 2000-34266.

Examiner's Refusal Decision for Japanese Patent Application No. 2000-34267 dated Mar. 9, 2005 with translation, 4 pages.

Avaya, Inc. Business.Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya Inc. 2003.

Avaya Inc. CentreVu Advocate, Release 9, User Guide, Dec. 2000.

"Internet Protocol Addressing," available at http://samspade.org/d/ipdns.html, downloaded Mar. 31, 2003, 9 pages.

"Domain Name Services," available at http://www.pism.com/chapt09/chapt09.html, downloaded Mar. 31, 2003, 21 pages.

Bellsouth Corp., "Frequently Asked Questions—What is a registar?," available at https://registration.bellsouth.net/NASApp/DNSWebUI/FAQ.jsp, downloaded Mar. 31, 2003, 4 pages.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Coles, Scott, "A Guide for Ensuring Service Quality In IP Voice Networks," Avaya, Inc., 2002, pp. 1-17.

Avaya, Inc., "The Advantages of Load Balancing in the Multi-Call Center Enterprise," Avaya, Inc., 2002, 14 pages.

Foster, Robin, et al., "Avaya Business Advocate and its Relationship to Multi-Site Load Balancing Applications," Avaya, Inc., Mar. 2002, 14 pages.

Chavez, David, et al., "Avaya MultiVantage Software: Adapting Proven Call Processing for the Transition to Converged IP Networks," Avaya, Inc., Aug. 2002.

Avaya, Inc., "Voice Over IP Via Virtual Private Networks: An Overview," Avaya, Inc., Feb. 2001, 9 pages.

Avaya, Inc., "Better Implementation of IP in Large Networks," Avaya, Inc. 2002, 14 pages.

"Multi-channel Comparison of Traditional ACDs with Cisco ICM Enterprise Edition vs. Cisco IP Contact Center Enterprise Edition" Cicso White Paper, date unknown, Copyright 1992-2004, pp. 1-4.

"Standard ECMA-180", available at http://www.ecma-international.org/publications/standards/Ecma-180.htm, Jun. 1992, 1 page.

Micahael "The Customer Always Clicks Twice", Nov. 1, 1999, 1 page.

"Media Blender Configuration Handbook" available at http://www.cisco.com/application/pdf/en/us/guest/products/ps959/c1067/ccmigration_09186a00800fd782.pdf., date unknown, pp. 1-35.

* cited by examiner

COORDINATING WORK ASSIGNMENTS FOR CONTACT CENTER AGENTS

RELATED FIELD OF THE INVENTION

Present invention relates to a method and system for coordinating the assignment of tasks to agents of a contact center (e.g., a customer support center), wherein such tasks are generated by sources, e.g., work management systems, which do not take into account task assignment by other such sources.

BACKGROUND

Contact centers or call centers are centralized systems that distribute telephony calls among a plurality of personnel at such call centers. However, it is increasingly desirable for agents in contact centers to efficiently perform additional tasks other than addressing incoming telephony calls. In such multi-functional or multimedia contact centers, it is desirable, e.g., for agents to respond to email, respond to Internet online information requests, review (offline) information supplied by customers (e.g., loan requests, health care forms, etc.). Unfortunately, for contact center tasks that are not initiated by an incoming call, it has been difficult to efficiently manage and assign such tasks to agents. Part of this difficulty is due to the fact that there has been heretofore no integrated task assignment system for efficiently allocating contact center agents for both responding to incoming calls as well as performing other tasks.

Typically, the distribution of incoming calls within a contact center is performed substantially automatically by telephony equipment that includes an "automatic call distributor" (ACD). An ACD is a specialized phone system (or portion thereof) for handling a large volume of incoming calls, and distributing the calls among the personnel (usually denoted agents) according to particular criteria such as to minimize caller waiting time, and/or to route calls to appropriate agents. For example, an ACD may keep track of which agents are available for taking an incoming call, and may direct calls to agents whose telephone lines are not busy. In some cases, an ACD may direct calls based on what a caller selects by, e.g., pressing the telephone keypad (the caller, for example, might respond to recorded system prompts to enter an account number or choose a service option). Thus, an ACD may both route and queue calls to one or more groups of agents, wherein for each group, the agents therein have particular skills appropriate to respond to particular types of calls. Moreover, an ACD is typically programmable so that changes in matching incoming calls with appropriate informational sources (e.g., agents) may be programmatically changed. Additionally, ACDs are able to generate detailed reports regarding the call traffic being experienced and/or processed.

In some contact centers, assignment of agents to tasks not initiated by an incoming call is entirely manual such as a bullhorn, loudspeaker, and/or manually maintained boards attached to the walls of the contact center. In other contact centers, one or more additional computer systems may also be used to distribute work to agents or dispatch agents to work. However, since these additional automation systems are not integrated with the ACD, conflicts result with the ACD, and/or at least some of the call distribution features of the ACD may be rendered inoperative. In some contact centers, contact center personnel initiate incoming telephony calls to particular agents merely to establish a telephony connection to a particular agent so that the ACD will cease from routing incoming calls to the agent for as long as the telephony connection to the agent's phone is maintained. Thus, since such "agent free up" calls do not require the agent to perform any tasks other than accept the call and subsequently terminate the call at some future time, the agent is free in the meantime to perform tasks other than answering incoming calls. However, this latter technique ties up telephony lines that otherwise could be used for processing substantive incoming calls. Moreover, since the ACD (or the corresponding private branch exchange (PBX)) typically collects data related to, e.g., the number of incoming calls processed, the length of such calls, the number of calls processed per agent (or group of agents), and the time incoming calls are queued, such agent "free up" calls distort the statistics collected by the ACD (or PBX). Additionally, if there are other computer systems also attempting to control an agent's time, such other work assignment systems will not be affected, and accordingly, further steps can be required to notify, fool or circumvent such other work assignment systems as well. In particular, where the contact center also assigns agents to take automatically dialed outgoing calls (by, e.g., what is known as a "dialer" in the art), the dialer also must be in some manner notified, fooled or circumvented if an agent is to perform tasks outside of the control of the dialer.

Additionally, some contact centers use what is known in the art as "phantom calls" to provide various notifications of agent availability or unavailability to the ACD. Phantom calls are calls having no caller identification information. Thus, phantom calls typically have no voice channel. For ACDs (and/or their associated PBXs) that can utilize phantom calls, such calls may be treated substantially as a voice call by such ACDs. However, phantom calls: (a) may have various manufacturer limitations on their use, (b) may require a predetermined collection of phantom call lines and/or phantom extensions to be allocated, (c) may increase the cost of the contact center telephony system (e.g., the PBX and ACD) and (d) when phantom calls are used to assign an agent to task different from answering incoming calls, the phantom call must remain active for the duration of the time the agent performs the task. Moreover, many legacy PBXs and legacy ACDs currently in use do not support phantom calls.

Accordingly, it would be desirable to have an alternative method and system for efficiently assigning both incoming and outgoing calls to contact center agents as well as assigning other tasks such as responding to email, and responding to online or chat Internet information requests. Additionally, it would be desirable to enhance contact center contact processing systems so that for both telephony and non-telephony agent activities and tasks, routing and monitoring are more effectively performed, and wherein various agent task management systems are more fully integrated with the task assignment capabilities of the ACD.

DESCRIPTION OF TERMS

Private Branch Exchange (PBX): This term identifies a device which provides private local voice switching and voice-related services: (a) within a corresponding private network, and (b) for telephony calls with parties outside of the private network. Thus, a PBX is a telephone switching system that can interconnect telephone extensions at the premises of an enterprise (e.g., a corporation, organization, or business unit), as well as connect such extensions with an outside telephone network (e.g., a public switched telephone network) that provides telephone connection with parties external to the premises. A PBX may include functions such as least cost routing for outside calls, call forwarding, conference calling and call accounting. PBXs may use all-digital methods for switching and may support both digital terminals and telephones along with analog telephone communications.

Dialer: A software component for automatically dialing a collection of telephone numbers, wherein the calls may be predictively dialed calls outbound from a contact center. Moreover, the dialer may command a PBX to connect each such answered predictively dialed call to an agent.

Directory Number (DN): A phone number of the contact center, wherein for a call to such a phone number, the phone number is used to identify: (1) the type of work that needs performed for the phone call, and/or (2) where an ACD for the contact center will route the call. The ACD routes contact center incoming calls to different agents depending on the types of calls (see "call group" and "call type" descriptions hereinbelow). Such call types are determined primarily by the called directory numbers of the incoming calls, and the types of calls to which the agents are currently assigned to take.

Outbound (or outgoing) Call: A call from a contact center to a destination phone number, wherein the destination phone number is not a phone number of the contact center.

Predictively Dialed Call: An outbound call from a contact center, wherein only after it is detected that the call is answered, is an agent also connected to the call.

Proxy Call: A telephony call similar to a phantom call in that it is used primarily for notification within a contact center. However, a proxy call may be a conventional telephone call (e.g., having a voice channel, information identifying a destination phone number for the call, and information identifying a source of origination of the proxy call). Thus, proxy calls can be processed by a PBX and ACD just as any other incoming telephone call. For example, a proxy call can be a POTS call (i.e., a plain old telephone service call) which is functionally limited to voice communication between a caller and a called party. Accordingly, any PBX and corresponding ACD, without modification, can appropriately switch or route proxy calls. Thus, in particular, proxy calls can be processed by legacy PBXs, and legacy ACDs.

Skill(s): This term refers to one or more agent skills related to the call center, and in particular, to agent skills that are useful in a call center (e.g., customer billing issues, customer product returns, etc.). Each such skill (or set of skills) is typically identified by an encoding at the contact center so that agent tasks or work items can be assigned to agents according to, e.g., their skills (or set of skills) in which the agent is identified by the contact center as being proficient. The term "skill" or "skills", as used herein, is synonymous with any of the following terms used in the art for identifying agent expertise related to the operation of a call center: "skill set(s)", and "splits".

Work Item: In a first use, this term refers to a task(s) to be performed by a contact center agent. Such tasks may include responding to email messages, conversing in Internet chat sessions, agent dispatches for training or meetings, agent free time (e.g., coffee break), an agent emergency (personal or otherwise).

Work Item Data (or Agent Request Data): These terms are used synonymously and refer to data generated by a work management system (or a dialer) for identifying and describing a work item, wherein this data may include, e.g., a customer phone number, an account balance of the customer, a prescribed remediation (e.g., a change to a customer's account), detailed description of trouble the customer is having, or a summary of the history of the customer's account.

Work Management System: A computer-controlled process for routing work items to agents and assigning agents to work items. Each work management system typically does not itself have a capability to coordinate agent requests (e.g., resolve conflicting agent requests) with agent requests from any other work management system (or with an automatic call distributor) for assigning work items corresponding to agent requests to the agents. Note that a dialer is a type of work management system.

Call Group: This term is used herein to refer to: (1) a class of calls (for each class, the calls therein are identified as requiring a common agent skill set and/or requiring a common set of one or more tasks to be performed), or (2) a class of agents defined in an ACD wherein each agent in the class has skills for appropriately processing the calls of a corresponding class of calls.

When the term "call group" represents a class of calls, information identifying the class is available to an ACD, wherein upon receiving a call identified as belonging to this class, the ACD uses the call's membership in the call group to determine the treatment of the call, including how it is routed, and what processing program(s) is activated.

When the term "call group" is used to represent a group of agents, the group of agents has associated therewith a collection of one or more skills, and each agent of the group has the collection of skills. An agent's association with one or more call groups determines the kinds of calls distributed to the agent. There is not normally a one-to-one correspondence between the group directory numbers and the agent groups. The directory number identifies the type of work that needs service. The ACD is programmed to deliver that type of call (representing the type of work) to at least one appropriate group of agents. Agents can belong to more than one agent group or equivalently agents can have more than one skill or set of skills. An agent call group is often called an "agent group".

Call Type: A description indicating the nature of a call to a contact center; e.g., call types may identify a call as related to: a billing issue, a technical support issue, an item return issue, etc. A call type may be used to identify calls within a particular call group.

SUMMARY

A method and system for assigning tasks to contact center agents is disclosed, wherein an automatic call distributor (ACD) used for distributing incoming telephone calls to the agents is also used to distribute other tasks to the agents. That is, these other tasks are not for servicing incoming calls distributed by the ACD. Instead, these tasks may be, e.g., (i) responding to email, (ii) attending meetings, (iii) conversing with individuals in Internet chat sessions, and/or (iv) conversing with called parties whose phone numbers have been predictively dialed by a dialer (cf. the Description of Terms above) within the contact center. When such an agent task (different from handling an incoming call) is determined, a corresponding "proxy" telephone call is generated from within the contact center to a corresponding PBX for the center so that an agent can be assigned to the task. For example, proxy calls may be generated by a dialer that is typically used for predictively dialing contact center outbound calls. The proxy call may not be identified by the PBX as a call originating from within the contact center, and thus the proxy call may be processed substantially identically to any other incoming call requesting an agent's services. Such a proxy call has, as its destination phone number (also denoted "directory number" or "DN"), one of the one or more phone numbers that is assigned to a predetermined contact center call group from which an agent is to be selected for the task. Additionally, in at least some embodiments, the directory number of a proxy call is also used to identify a source of the agent request corresponding to the proxy call, e.g., such a directory number is used to identify where detailed information about the task is stored. In one preferred embodiment, when a proxy call is routed by the ACD to a selected agent's worksite, the call destination directory number is also used to fetch the detailed information about the task so that it can be performed. Additionally, since the selected agent has been assigned a task corresponding to the proxy call, it is an aspect of the invention that the ACD is notified that the selected agent is to be unavailable for further incoming calls until further notice. Thus, such notification avoids potential conflicts, wherein the ACD might assign an incoming call to the selected agent while the selected agent is performing the task corresponding to the proxy call.

However, it is also an aspect of the invention that if the task corresponding to the proxy call is interruptible for taking contact center incoming calls, a monitor component may reassign the selected agent to handling incoming calls. Note that in at least some embodiments of the work distribution and agent dispatching system disclosed herein, the assignment of an agent to handle predictive outbound calls is identified as an interruptible task. Other such interruptible tasks may be training exercises, research activities, order fulfillment, and other back office processes.

Further description of advantages, benefits and patentable aspects of the present disclosure will become evident from the accompanying drawings and description hereinbelow. All novel aspects of the disclosure, whether mentioned explicitly in this Summary section or not, are considered subject matter for patent protection either singly or in combination with other aspects of this disclosure. Accordingly, such novel aspects disclosed hereinbelow and/or in the drawings that may be omitted from, or less than fully described in, this Summary section are fully incorporated herein by reference into this Summary. In particular, all claims of the Claims section hereinbelow are fully incorporated herein by reference into this Summary section.

DETAILED DESCRIPTION

Figure 1:
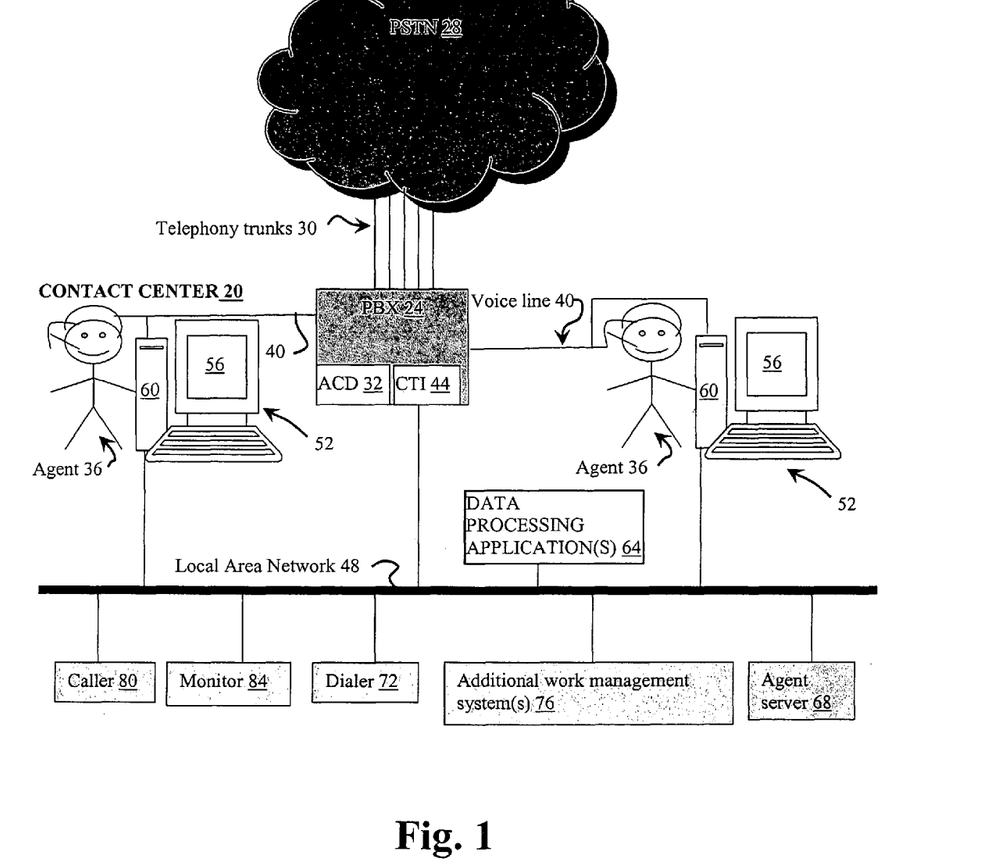
FIG. 1 shows an illustrative embodiment of a novel contact center 20.

FIG. 1 shows a high level view of a representative embodiment of a contact center 20 and the components thereof utilized by an embodiment of a contact center integrated task management system that is distributed among the components of FIG. 1. Accordingly, the contact center 20 includes (or at least accesses) a private branch exchange 24 (PBX) for establishing, routing, maintaining, and disconnecting telephony calls with at least one public switched telephone network (PSTN) 28 via the telephony trunks 30. Additionally, the PBX 24 performs similar such functions for parties within the contact center 20. The PBX 24 includes an automatic call distributor (ACD) 32 for routing calls to contact center agents 36 via corresponding telephony voice lines 40. The ACD 32 routes incoming calls to different agents depending on the types of calls determined primarily by the called directory numbers of the incoming calls, and depending on the types of calls to which the agents are assigned. The ACD 32 queues incoming calls when appropriate agents are not available. The ACD 32 distributes such queued calls to agents as the appropriate agents become available. Likewise, the ACD 32 queues agents pending the arrival of appropriate work.

Since the ACD 32 can access data identifying agent skills (as described hereinabove in the Description of Terms), such data can be used in performing the above-mentioned routing and queuing tasks. In particular, for an incoming call, the ACD 32 identifies the call type (as described in the Description of Terms section hereinabove) for the call, and then routes the call to an appropriately chosen agent having the skill(s) corresponding to the call type etc. Thus, for an incoming call identified as a call type for billing service, such a call will be, e.g., routed by the ACD 32 to an agent with the skills required to handle billing matters. More specifically, the ACD 32 will either route the call to an agent with the skill set required by the call type identified by the directory number called, or if no such agent is currently identified by the ACD as available, queue the call until such an agent becomes available to take the call. Note that it is not uncommon for an agent to have skills for handling various types of calls. Thus, agents may not necessarily be organized into mutually exclusive groups. Additionally, the ACD 32 can use other attributes of incoming calls to classify and route them.

The PBX 24 also includes a computer telephony interface (CTI) 44 for monitoring and controlling telephony calls to the agents 36 via communications on the local area network (LAN) 48. In particular, the LAN provides communications between the PBX 24 and, e.g., each agent's telephony enabled workstation 52 and various other computational components of the contact center 20, as described hereinbelow. In particular, each telephony enabled workstation 52 includes at least a display 56 and a computer 60 in communication with the LAN 48 for assisting an agent 36 in handling calls (e.g., both incoming and outgoing), as well as performing other tasks such as responding to email, reviewing Internet submitted information, interactively corresponding with a customer via Internet text chat capabilities, and activating data processing applications such as loan processing applications, database retrieval applications, ticket purchase applications, etc. Thus, agents 36 may use their corresponding telephony enabled workstations 52 for communicating on the LAN 48 with one or more data processing applications 64 for inputting information thereto and retrieving information therefrom. Additionally, each telephony enabled workstation 52 is used to communicate the availability (or unavailability) of the agent at the workstation for various tasks such as those recited above.

For each telephony enabled workstation 52, there is an agent server 68 for assisting in communicating with other components on the LAN 48, and for monitoring telephone calls (on the LAN) that are directed to the agent's telephony enabled workstation. In particular, each agent server 68 can use information obtained from such calls to register the availability of a corresponding agent to handle, e.g., telephony calls (incoming or outgoing). Thus, the agent server 68 may transmit instructions to the ACD 32 requesting that a corresponding agent 36 be removed from one or more groups of agents that are identified by the ACD for receiving incoming calls. Additionally, as is described further hereinbelow, each agent server 68 may intercept the directory numbers of proxy calls, and use such numbers to identify work management system queues having the work item data (also denoted as "agent request data" herein) corresponding to the proxy calls. Note, FIG. 1 shows a unique agent server 68 for each workstation 53; however, a single agent server 68 may be used for assisting multiple workstations.

The embodiment of FIG. 1 also includes a dialer 72 which is a computational component for monitoring agent 36 activities, and assigning outbound telephone calls to agents. The dialer 72 obtains collections of telephone numbers to which outbound phone calls are to be placed. Each phone number may have associated therewith a particular subject and/or information to be discussed with an appropriate party answering the outbound call. Additionally, the dialer 72 may be provided with information (e.g., the directory number, also denoted "DN" herein) for an agent group whose agents are skilled in taking the phone call once the outbound call is answered. Thus, the dialer 72 will typically have an agent 36 assigned to take outbound calls prior to initiating the dialing of such a call. So, in order to resolve and/or avoid contention between the ACD 32 and the dialer 72, an assignment of an agent to the dialer 72 preferably implies that the agent is identified to the ACD as unavailable. Note, that the dialer 72 may not include telephony hardware such as line termination ports, tone generators, line switching facilities, and call progress analysis cards. Instead, the dialer 72 may rely on the telephony capabilities of the PBX 24 to dial outbound calls, and once answered then connect (via the voice lines 40) the calls to agents 36 designated by the dialer.

Although both the ACD 32 and dialer 72 can be considered work management systems, contact center 20 embodiments such as that of FIG. 1 may also include one or more additional work management systems 76 that communicate with other components shown in FIG. 1 (via the LAN 48) for assigning agents to perform various tasks such as responding to emails, conversing with third parties (e.g., via Internet text chat sessions), participating in agent training, dispatching agents (e.g., for contact center meetings, employee breaks, etc). Accordingly, each such additional work management system 76 includes a computer-controlled process for the routing and monitoring of particular types of data for agent work items (equivalently, tasks). Each work management system 76 does not typically take into account the agent assignments and work distribution of: any other work management system 76, the ACD 32, or the dialer 72. Accordingly, conflicts between agent task assignments output by different work management systems 76, and/or the ACD 32, and/or the dialer 72 can potentially occur unless procedures and components such as disclosed herein are utilized.

FIG. 1 also includes a caller 80 component for generating telephony calls (via the LAN 48) to designated group directory numbers (DNs) for call groups known to the ACD 32 and/or the dialer 72. In particular, whenever the caller 80 receives a request to do so, it initiates a telephone call(s) in the PBX 24 (via the CTI 44). Note, the caller 80 may also disconnect a previously initiated call, e.g., in the case where there are more proxy calls queued in the ACD 32 than there are requests for agents 36.

A monitor 84 is also included in the contact center 20, wherein the monitor interrogates the dialer 72, and the (any) work management system(s) 76 for data (e.g., records) identifying pending work items. As will be described further hereinbelow, when the monitor 84 detects a queued work item data needing distribution to an agent 36, the monitor signals the caller 80 (via the LAN 48) to initiate a corresponding proxy call to the PBX 24 for coordinating the work item with other agent work items from the dialer 72, any other work management system(s) 76, and/or work items related to incoming calls. That is, the monitor 84 maintains (by notifying the caller 80 to initiate appropriate proxy calls to the ACD 32) queued telephony proxy calls in the ACD which are proxies for requests for agents 36. The monitor 84 also maps the work type of a work item to a corresponding directory number (DN). In particular, the monitor 84 detects each item generated by a work item source (e.g., the work management system(s) 76 and/or the dialer 72), and also determines a work type for each work item, e.g., by identifying the source of the work item and/or accessing a data table identifying the work type of work items generated by each work management system and the dialer. However, in other embodiments, the monitor 84 may parse or otherwise inspect such work items to identify their work type. For work management systems 76 responsive to incoming calls (e.g., customer request for a callback), the data for the work items queued by such a system 76 can represent requests for agents 36 to respond to such incoming calls. Alternatively, for work management systems 76 (and the dialer 72) requiring the activation of contact center outbound calls, each corresponding work item can represent a request for an agent 36 independently of the arrival of incoming calls for agents. Note that such a work management system 76 (and the dialer 72) for activating outbound calls can typically indicate or estimate how many more agents 36 are needed to complete the work items queued, wherein each of the agents may potentially handle a plurality of outgoing calls as part of a single work item.

Although the embodiment of FIG. 1 is illustrative of a system architecture for the present invention, other embodiments of the contact center 20 are also within the scope of the present disclosure. For instance, one or more of the following variations to the contact center 20 of FIG. 1 are within the scope of the present disclosure:

(a) The dialer 72 may be integrated with the caller 80.
(b) The dialer 72 may be integrated with the monitor 84.
(c) The caller 80 and/or the monitor 84 may be included as part of one of the work management systems 76 (or the dialer 72);
(d) One or more of the work management system 76 (or the dialer 72) may have their own caller 80 and/or monitor 84 for initiating proxy calls and/or monitoring their work item queues;
(e) The agent server 68 functionality may be provided in the dialer 72;
(f) The telephony enabled workstation 52 functionality as disclosed herein may be substantially transferred to a network server so that the resulting workstation functionality may be substantially only an application (e.g., a browser) for accessing such a network server; and/or
(g) The functionality of one or more agent servers 68 may be provided on the corresponding workstations 52.

However, for any of the above-described components, including the workstation(s) 52, the agent server(s) 68, the dialer 72, the work management system(s) 76, the caller 80, and the monitor 84, when such components are distinct, they will each have a distinct LAN 48 network address as one skilled in the art will appreciate.

Figure 2A:
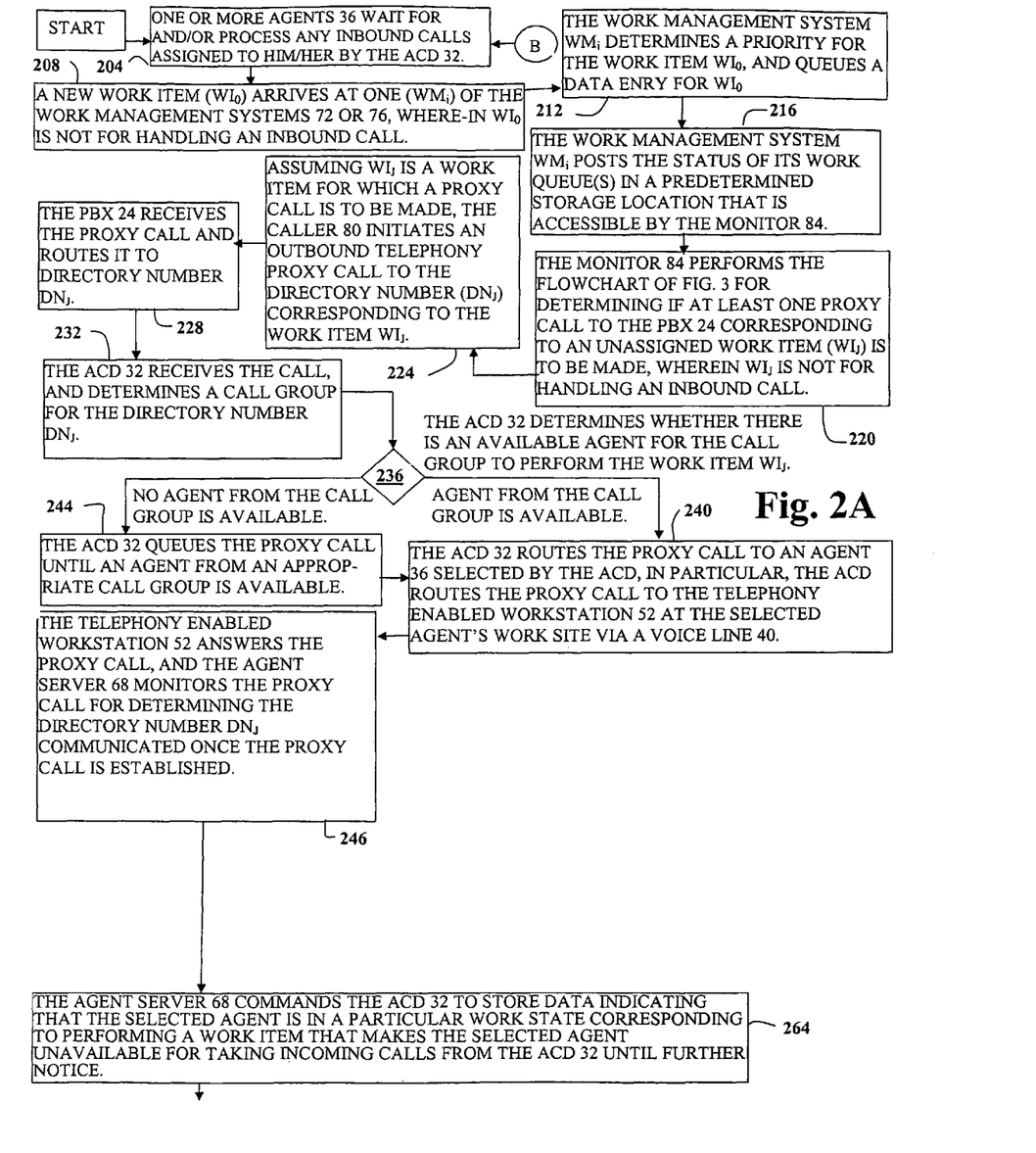
FIGS. 2A through 2C show an embodiment of a flowchart of the steps performed by the contact center 20 for unifying the assignment of work items to contact center agents.
Figure 2B:
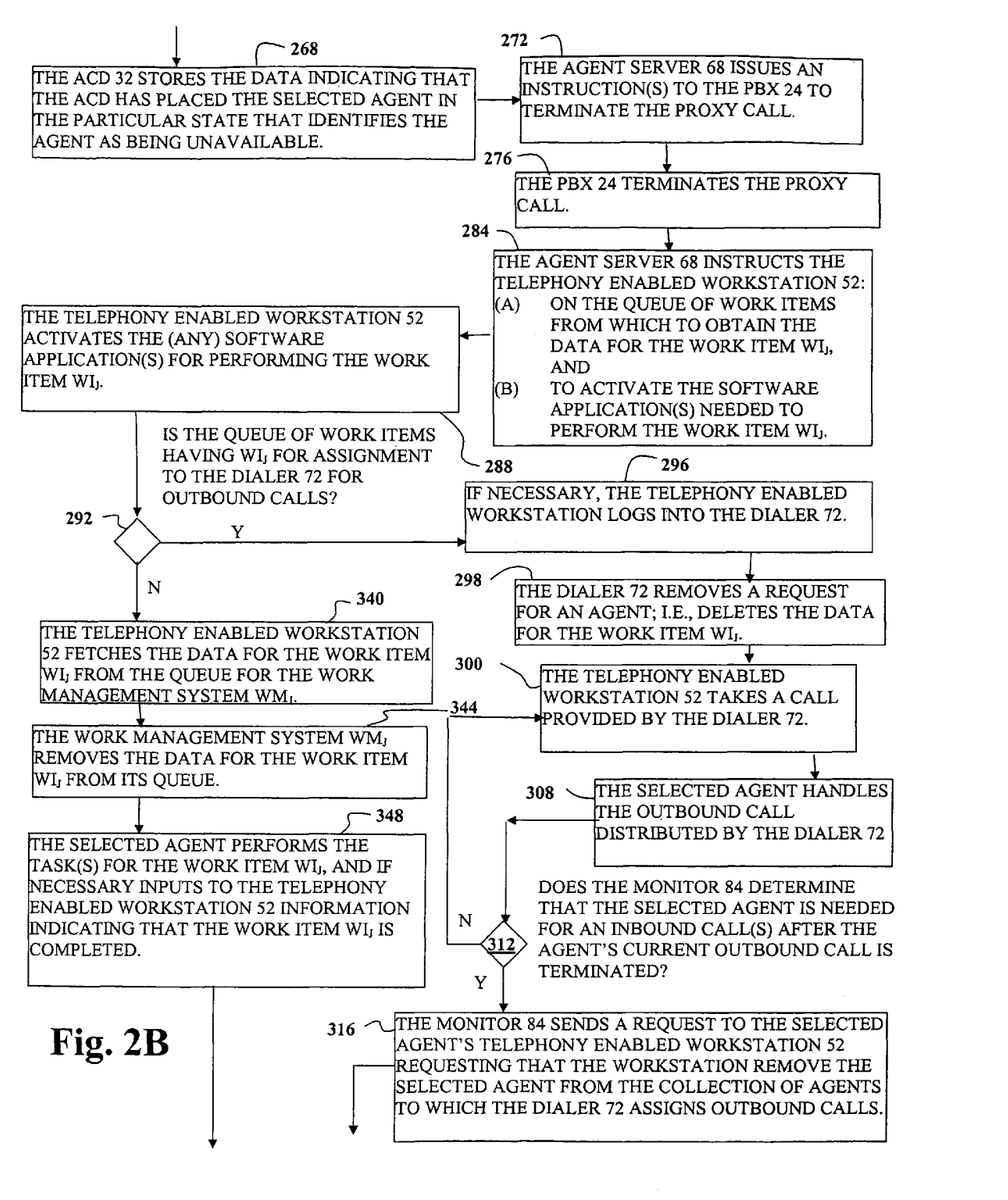
Figure 2C:
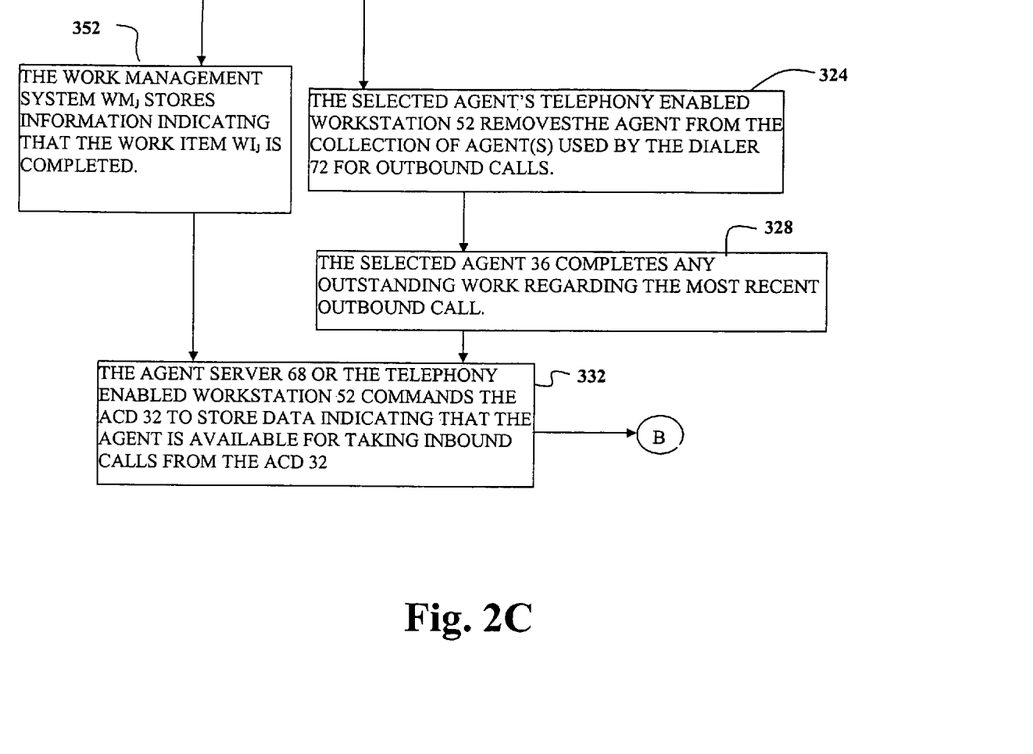

FIGS. 2A-2C disclose an embodiment of the steps performed by the above described contact center 20 components for coordinating the distribution of agent work items among a plurality of competing agent dispatching systems (e.g., the ACD 32, the dialer 72, and/or other work management systems 76). In step 204 of FIG. 2A, one or more agents 36 wait for and/or process any calls incoming to the contact center 20 that have been assigned to them by the ACD 32. Note that it is assumed that all agent work items corresponding to an active incoming telephony call are automatically queued and/or routed to agents appropriately by the ACD 32. However, such an assumption is merely to simplify the description herein. Subsequently, in step 208, a new agent work item ($WI_0$) arrives at one of the work management systems ($WM_i$), i.e., the dialer 72 or one of the additional work management system(s) 76 (note that such a work management system may be another ACD). In particular, it is assumed that the work item $WI_0$ is not for assigning an agent to handle a contact center 20 incoming call that has been routed and/or queued by the ACD 32. After the work item $WI_0$ arrives, in step 212, the work management system $WM_i$ determines a priority of the work item $WI_0$ relative to any other pending work items identified by the work management system $WM_i$, and queues the work item data for $WI_0$ according to its priority. Subsequently, in step 216, the work management system $WM_i$ posts (via the LAN 48) the status, and/or contents of its work item queue in a predetermined storage location that is accessible by the monitor 84. In particular, a work item database (not shown) may be operatively associated with the monitor 84 for receiving the asynchronously posted information from the (any) work management systems 76 and 72.

Figure 3:
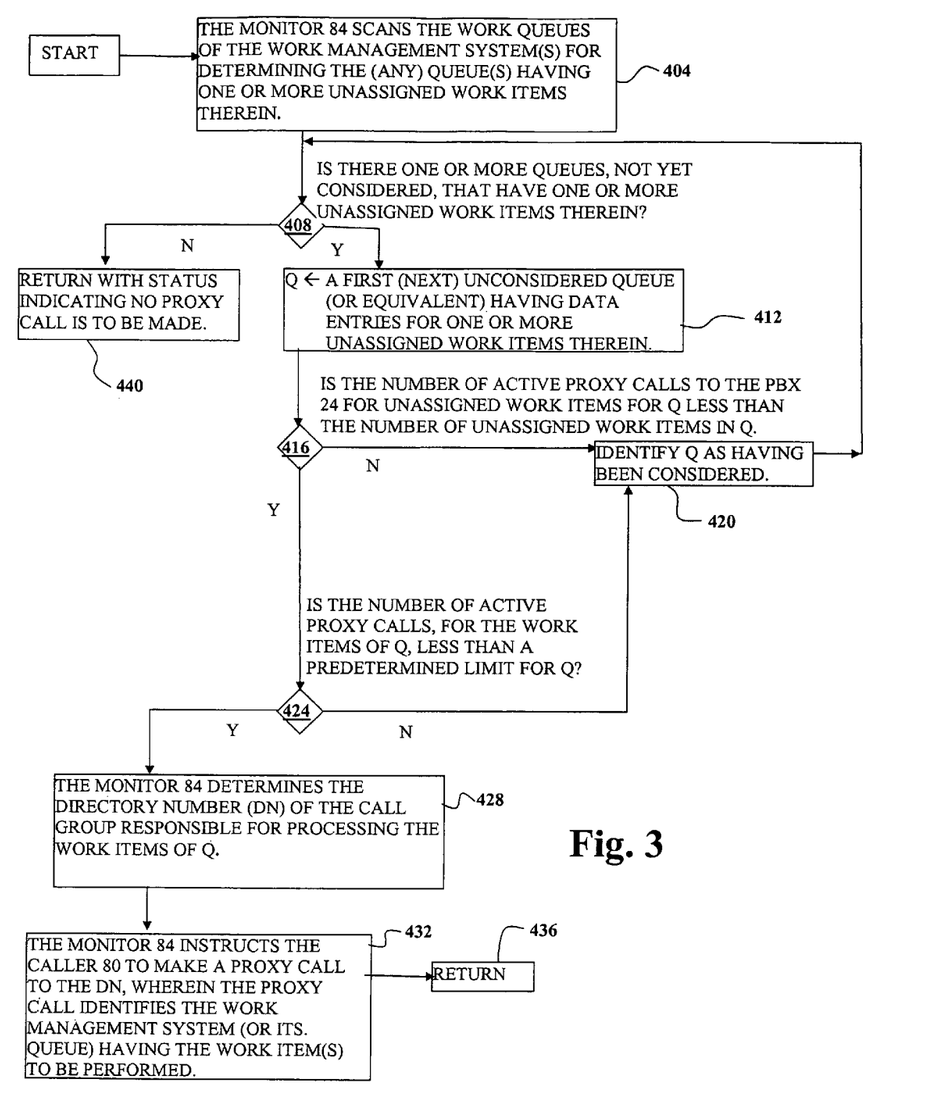
FIG. 3 is a flowchart of an embodiment of steps performed by the monitor 84 for determining a work item for which a corresponding proxy call is to be subsequently generated.

When the monitor 84, in step 220, detects or is notified of the newly posted work item information, the monitor determines if (and/or when) one or more proxy calls to the PBX 24 are to be made according to the flowchart of FIG. 3. In particular, each such proxy call is for assigning an agent to a posted work item. Note that each of the one or more posted work items identified for initiating a proxy call need not necessarily include $WI_0$; additionally such a work item (for which a corresponding proxy call is generated) need not even be from the queue for the work management system $WM_i$. For example, all work management system queues may be inspected by the monitor 84 for identifying work items for which proxy calls are to be made. Thus, an identified work item may be from a work management system different from $WM_i$. Moreover, in one embodiment, all work items, having corresponding queued data, may have corresponding proxy calls generated (assuming any predetermined limit(s) on the number of proxy calls is not exceeded as disclosed in FIG. 3 and described hereinbelow). For simplicity of description of the flowchart of FIG. 2, however, it is assumed that the data for a single work item ($WI_J$) is determined for having a corresponding proxy call activated, wherein the work item $WI_J$ is from a work management system identified as $WM_J$; however, this should not be considered to be a limitation of the present disclosure. In particular, the steps subsequent to step 220 could be iteratively performed for each work item for which a corresponding proxy call is generated in step 220.

In step 224, in response to a request received from the monitor 84 (via the LAN 48), the caller 80 determines a directory number ($DN_J$) corresponding to a request for an agent to perform the work item $WI_J$. Subsequently, the caller 80 generates a corresponding outbound proxy telephony call to the directory number $DN_J$ via the LAN 48.

In step 228, the PBX 24 receives the proxy call from the caller 80, and routes the proxy call to the directory number $DN_J$. In step 232, the ACD 32 receives the routed proxy call, and determines a call group corresponding to the directory number $DN_J$. Subsequently, in step 236, the ACD 32 determines whether there is an available agent to perform the work item $WI_J$ from this call group. If an agent is available, then in step 240, the ACD 32 routes the proxy call to an available agent selected by ACD. Note that the proxy call is routed to the selected agent via a voice line 40 to the selected agent. In one embodiment, the ACD 32 routes the proxy call to the telephony enabled workstation 52 at the selected agent's work site. Alternatively, if step 236 determines that no agent in the call group is available, then in one embodiment the ACD 32 may identify another call group corresponding to the directory number $DN_J$ for determining an available agent 36. Assuming that an available agent 36 can not be found in any of the one or more call groups inspected in step 236, in step 244 the ACD 32 queues the proxy call until an agent from an appropriate call group becomes available.

Accordingly, once an agent becomes available from an appropriate call group, step 240 is performed, wherein the ACD 32 routes the proxy call to the workstation 52 for the selected agent.

Subsequently in step 246, the selected agent's workstation 52 answers the proxy call, and the corresponding agent server 68 monitors the proxy call for determining the directory number corresponding to the proxy call. In particular, for determining the directory number, the ACD 32 transmits, via the CTI 44, a notification that the call to the selected agent is complete, and the corresponding agent server 68 detects the notification. Then in step 264, the agent server 68 issues a command to the ACD 32 (via the LAN 48) to store data indicating that the selected agent 36 is in a particular work state for performing a work item that makes the selected agent unavailable for taking incoming calls from the ACD 32 until further notice. Upon receiving the command (step 268), the ACD 32 stores the data identifying the selected agent 36 as unavailable, and the agent server 68 may confirm that the ACD has stored this data. The agent server 68 then transmits a message (via LAN 48) to the PBX 24 to terminate the proxy call (step 272), and in step 276, the PBX 24 terminates the proxy call.

In step 284, the agent server 68 transmits a message to the selected agent's workstation 52 providing information: (a) identifying the work management queue of work items from which to obtain the data identifying the work item $WI_J$, and (b) identifying the (any) software application(s) to be activated for performing this work item. Note that the information of (a) and (b) immediately above may be derived by the agent server 68 by accessing a collection of data associations (e.g., a data table), wherein each association (e.g., table row) associates at least one directory number ($DN_x$) with access information (e.g., a pathname or network address) for accessing a work management system 72 or 76 (or more particularly, a queue therefor) having the work item data for $WI_J$. In particular, an association of the collection (e.g., a table row) for $DN_J$ may include the LAN 48 address of the work management system 76 (or its work item queue) from which the workstation 52 can retrieve data for the work item $WI_J$. Additionally, such an association may also include an identification of the (any) software application(s) to be activated for performing $WI_J$.

Once the selected agent has completed handling any incoming call assigned to the selected agent by the ACD 32, in step 288, the selected agent's workstation 52 activates the (any) software application(s) for performing the work item $WI_J$. Note, it is within the scope of the present disclosure that such software applications may be at least as varied as the tasks currently assigned to contact center or call center agents. Accordingly, in addition to the non-call tasks identified above, the following are also representative of such non-call handling tasks:

(a) reviewing problem accounts;
(b) reading training materials;
(c) interviewing candidates for employment;
(d) evaluating job performance; and
(e) attending a meeting for improving the quality of work.

In step 292, a determination is made by, e.g., the selected agent's workstation 52 as to whether the work item $WI_J$ is an assignment to the dialer 72 for handling outbound calls. If so, then in step 296 the agent's workstation 52 may identify itself to the dialer 72 (e.g., login to the dialer via LAN 48) for receiving outbound calls via the voice line 40. Then in step 298, the dialer 72 deletes the data representative of the work item $WI_J$ (which may be substantially only the decrementing by one of a posted value indicating the number of additional agents being requested by the dialer). Subsequently, the selected agent's workstation 52 is connected to an outgoing call provided by the dialer 72 (step 300). In particular, the dialer 72 commands the PBX 24 via the LAN 48 to dial outgoing telephone calls, and instructs the PBX 24 via the LAN 48 to connect the call to the selected agent 36 via voice line 40 when the PBX detects that the telephone of the called party is picked up or answered by, e.g., a person. Following step 300, step 308 is performed, wherein the selected agent 36 handles the call.

Following the termination of the outgoing call, the monitor 84 determines whether the selected agent 36 is needed for an incoming call(s) (step 312). In particular, the monitor 84 accesses previously stored agent availability information that identifies each agent 36 that is assigned to the dialer 72, and accordingly can be reassigned to incoming calls. Such agent availability information can be provided to the monitor 84 (or to a data store assessable therefrom) by the agent server 68 corresponding to the workstation 52 of the selected agent.

If the monitor 84 determines that the selected agent is not needed for incoming calls, then step 300 is again performed, thereby allowing the selected agent 36 to be connected to an additional outgoing call. Alternatively, if the monitor 84 determines that the selected agent 36 is needed for one or more incoming calls to the contact center 20, then the monitor 84 sends a request (via LAN 48) to the selected agent's workstation 52 requesting that the workstation remove the selected agent from the collection of agents 36 to which the dialer 72 can assign outbound calls (step 316). Subsequently, in step 324, the workstation 52 for the selected agent 36 sends a message (via LAN 48) to the dialer 72 requesting removal of the selected agent from the collection of agents to be connected to outgoing calls (e.g., the selected agent's workstation 52 logs the agent off of the dialer). Then in step 328, the selected agent 36 completes any outstanding work, e.g., the agent terminates the outbound call, inputs any data obtained from the call into an appropriate workstation application, and/or enters a summary of the call. Following step 328, step 332 is performed, wherein the agent server 68 or the selected agent's workstation 52 transmits commands (via the LAN 48) to the ACD 32 requesting that the ACD 32 designate this agent as now available for taking inbound calls from the ACD. Subsequently, step 204 and steps following are again performed.

Returning now to step 292, if the work item $WI_J$ is not determined to be an assignment of the selected agent 36 to the dialer 72, then step 340 is performed wherein the selected agent's workstation 52 fetches data for the work item $WI_J$ from, e.g., the queue of the work management system $WM_J$. In particular, the workstation 52 transmits a request for data identifying a work item to the work management system queue via the LAN 48. Note that although the work item data fetched is identified herein as $WM_J$ in previous steps, this data is only identified to the workstation 52 in the present step 340. Additionally note that this work item data may be the data for the work item that has been in the corresponding queue for $WM_J$ the longest time, or the data for a work item that has a highest priority. Subsequently, in step 344, the work management system $WM_J$ removes the fetched work item data for $WI_J$ from its queue of outstanding work item data entries. After the selected agent's workstation 52 receives the data identifying the work item $WI_J$, the selected agent 36 commences to perform the task(s) for completing the work item (step 348). Note that examples of the task(s) performed here have been recited above, such as responding to email, and attending contact center 20 training or meetings. Moreover, once the task(s) is completed (e.g., a contact center meeting is completed) the selected agent 36 may need to provide an input to his/her workstation 52 indicating that the work item is complete.

Regardless of how it is determined that the work item $WI_J$ has been completed, the selected agent's workstation 52 transmits a message to the work management system $WM_J$ indicating that $WI_J$ has been completed, and in step 352, the work management system $WM_J$ stores information that $WI_J$ has been completed. Subsequently, step 332 is again encountered, wherein the agent server 68 or the selected agent's workstation 52 transmits commands (via the LAN 48) to the ACD 32 requesting that the ACD designate that this agent is now available for taking inbound calls from the ACD.

Referring now to FIG. 3, this figure determines if (and/or when) the monitor 84 generates one or more proxy calls to the PBX 24 for providing (and assigning) one of the work items identified by the information posted by one of the work management systems 76 or 72 to a selected agent 36. In steps 404 and 408, each of the work management system(s) 76 and 72 has its queue (or any functionally equivalent data structure for tracking unassigned work assignments, e.g., a posted value by the dialer 72 indicating the number of agents being requested by the dialer) scanned by the monitor 84 for determining whether any of these queues (or equivalents) have one or more unassigned work item data entries therein (i.e., entries corresponding to work items that are currently unassigned to agents 36). In particular, for each activation of the flowchart of FIG. 3, all work management system queues (and equivalents) initially are to be considered for inspection, and accordingly can be described as initially "unconsidered". If at least one queue (or an equivalent) with at least one unassigned work item data entry is identified, then in step 412, one of these queues (or an equivalent), identified herein as "Q", is selected for further analysis. Accordingly, in step 416, the monitor 84 determines whether the number of active proxy calls to the PBX 24 for work item data entries in Q is less than the number of unassigned work item data entries in Q. If not, then there are at least as many active proxy calls for work item data entries in Q as there are unassigned work item data entries in Q. So, assuming that each time a work item is cancelled, whether completed or not, any corresponding active proxy call is promptly terminated, then each unassigned work item for an entry in Q already has a corresponding active proxy call. Accordingly, there is no new work item data entry in Q for which a proxy call must be generated. Thus, step 420 is performed, wherein the work management queue (or equivalent) currently identified by Q is identified as being considered. Note that data indicating that Q has been considered may be the result of, e.g., incrementing an index into the collection of unconsidered queues (and any equivalents) so that step 412 then identifies a next queue (or equivalent) to be considered. One skilled in the art will understand that there are numerous techniques for identifying or marking a data item (e.g., a queue) as being previously considered. Subsequently, step 408 is again performed for determining if there is at least one additional queue to consider.

Alternatively, if in step 416, it is determined that there are indeed fewer active proxy calls than unassigned work items for entries in Q, then step 424 is performed, wherein a determination is made as to whether the number of active proxy calls for the work item entries in Q is less than a predetermined limit. Note that this determination can be used to limit the number concurrent proxy call requests for agents 36 by a particular work management system 76 (or the dialer 72), thus, preventing the monitor 84 from requesting an inappropriate allocation of agents at any given time for any one of the work management systems. As one skilled in the art will appreciate, various additional or alternative constraints may also be provided to prevent excessive agent requests. For example, assuming $Q_0$ is a work item queue (or equivalent) for a particular one of the work management system(s) 76 or the dialer 72, the following constraints are representative:

(a) a limit on the number of proxy calls for $Q_0$ within a particular time period (e.g., an hour) must be less than a predetermined number, (b) a limit on the number of proxy calls for $Q_0$ within a particular time period (e.g., an hour) for a given agent work group, must be less than a predetermined number, (c) a limit on the proportion of proxy calls for $Q_0$ in comparison to the total number of proxy calls within a particular time period (e.g., a day) must be less than a predetermined percentage, (d) the maximum number of proxy calls for $Q_0$ must be inversely dependent on the incoming non-proxy call volume within a recent time period (e.g., an hour), and/or (e) the maximum number of proxy calls for $Q_0$ within a particular time period (e.g., a week or month) can not exceed 10% of the maximum of: (i) the number proxy calls for all work management systems 76, 72, in the immediately previous time period (e.g., the previous week or month), and (ii) the number of proxy calls for $Q_0$, in the corresponding same time period of the previous year.

Note that since, in at least one embodiment, each instance of Q (and/or $Q_0$) includes work item entries for a single call group, the above constraints can limit the utilization of call groups for purposes other than responding to incoming calls distributed by the ACD 32.

If it is determined in step 424 that the maximum allowable number of proxy calls for Q is not less than such a predetermined limit, then step 420 is again performed, wherein Q is identified as having been considered. Alternatively, if the predetermined limit on the number of active proxy calls for Q has not been achieved, then step 428 is performed, wherein the monitor 84 determines the directory number of the call group responsible for processing the work items represented in Q, and in step 432, the monitor instructs the caller 80 to make a proxy call to this call group's directory number, wherein the proxy call identifies the work management system (or, e.g., its queue) having the data entries for the work item(s) to be performed. Note, in one embodiment, the information communicated on the proxy call (i.e., the directory number), could include information identifying a particular work item entry within the queue. However, including such additional information in a proxy call is not necessary, and not the preferred embodiment.

Subsequently, after performing step 432, step 436 is performed wherein a return is made to the flowchart of FIG. 2, and step 224 is performed wherein the caller 80 initiates an outgoing proxy call as described hereinabove.

Finally, referring to step 408 of FIG. 3 again, if all work management system queues (and any equivalents) are determined to have been considered, and no work item data entry is found for which a proxy call is to be generated, then step 440 is performed wherein status data is returned indicating that no proxy call is to be made. Note, it is assumed for simplicity of description of the flowchart of FIGS. 2A-2C that the flowchart of FIG. 3 returns after the monitor 84 has instructed the caller 80 to generate a proxy call, i.e., via step 436.

The scope of the present disclosure is intended to include combinations of both hardware devices and software (including firmware). Suitable software for operatively enabling various aspects of the disclosure described herein, and/or shown in the accompanying figures, can be provided on a machine-readable medium or media, and can be coded using any suitable programming or scripting language. Accordingly, it is to be understood that the disclosure as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like, as well as various network communication languages such as Perl and Java.

Additionally, note that substantially any collection of one or more agents 36 can be identified as a call group, and each call group can be identified by one or more directory numbers. Thus, each agent 36 can be both: (i) identified as a call group having a unique directory number corresponding with a particular work management system 76, e.g., an agent training scheduler, and (ii) listed as a member of various other call groups each having a unique directory number corresponding with a particular work management system 76. Accordingly, substantially any combination of one or more agents 36 can be notified of a work item to be performed. For example, for calling a meeting of a plurality of agents not having a common directory number, individual work item data records for the meeting may be generated for each of the agents by a meeting scheduling work management system 76, wherein each of the correspondingly generated proxy calls is directed to only one of the agents for the meeting, and each of these proxy calls has its directory number associated with information identifying, e.g., the work item queue for the meeting scheduling work management system 76.

As those skilled in the art will also understand, the program(s) of instructions for embodying the various aspects of the present disclosure can be loaded and stored onto a program storage medium or device readable by a machine (e.g., a computer or other computational device) during execution of these program(s). The program storage medium can be implemented using any technology based upon materials having specific magnetic, optical, semiconductor or other properties that render them suitable for storing computer-readable data, whether such technology involves volatile or non-volatile storage media. Specific examples of such media can include, but are not limited to, magnetic disks and corresponding disk drives, optical storage media (e.g., CD/DVDs) and corresponding optical drives, and any memory technology based on semiconductors or other materials, whether implemented as read-only, read-write, and/or random access memory. In particular, an embodiment of one or more programmatic elements within the scope of the present disclosure (e.g., software for the monitor 84, the caller 80 or the agent server 68) may reside on a medium directly addressable by a computer's processor (main memory, however implemented), and/or on a medium indirectly accessible to the processor (secondary storage media such as hard disk drives, tape drives, CD-ROM drives, floppy drives, or the like).

Moreover, since various components of the present disclosure have been described in terms of communications on a network (e.g., LAN 48), such a network may be, for example, an IP network, an Ethernet based network, a token ring network, a Novell or AppleTalk network. Furthermore, a program storage device and/or a data storage device identified in structure or functionality hereinabove can be affixed permanently or removably to a bay, socket, connector, or other hardware provided by a cabinet, motherboard, or another component of a given computer system, or, such a program and/or data storage device can access via a given networked distributed computing system. For example, the data processing applications 64 may be accessible via the Internet.

Those skilled in the art will also understand that networked computational components in accordance with the above teaching, using known programming languages, provides suitable means for realizing the various functions, methods, and processes as described and claimed herein and as illustrated in the accompanying figures attached hereto.

The foregoing description has been presented for purposes of illustration and description. However, the description is not intended to limit the invention as claimed hereinbelow to the form disclosed hereinabove. Consequently, variations and modifications commensurate with the above teachings, within the skill and knowledge of the relevant art, are within the scope of the claims hereinbelow. The embodiments described hereinabove are further intended to explain the best mode presently known of practicing the invention claimed hereinbelow, and to enable others skilled in the art to utilize the claimed invention in various embodiments, and with the various modifications required by their particular application or uses of the invention. Thus, it is intended that the appended claims be construed to include alternative embodiments to the extent permitted by the prior art.

The invention claimed is:

1. A method for assigning to at least one agent, of a plurality of agents for a contact center, a work item, wherein a call distribution component for the contact center receives a plurality of incoming work items and routes the incoming work items to selected ones of the plurality of agents according to agent availability, comprising:

receiving a proxy call at a site for a selected agent, wherein the proxy call relates to assigning a work item to the selected agent such that the proxy call is not the work item;

wherein the selected agent is selected by the call distribution component from one of the agents of a group of one or more agents, and the call distribution component routes the proxy call to the site;

after the agent is selected, obtaining from the proxy call, work item related information wherein the work item related information is used to access at least one of: additional data indicative of the work item, and an application for performing the work item;

requesting that the call distribution component designate the selected agent as unavailable for taking a subsequent one of the incoming calls;

providing, to the selected agent, at least one of: the additional data indicative of the work item, and the application for performing the work item; and discontinuing the proxy call prior to the selected agent completing the work item.

2. The method of claim 1, wherein at least one of: the work item related information includes a directory number for the group, and the additional data includes agent request data for requesting an assignment of one of the agents to perform the work item.

3. The method of claim 1, further including accessing, after the call is routed, the work item related information for identifying the work item for assigning to the selected agent.

4. The method of claim 1, wherein the call distribution component includes at least one of: an automatic call distributor, and a private branch exchange.

5. The method of claim 1, further including accessing work item data that describes the work item to be performed, the work item data obtained from one of: a work management system and a dialer.

6. The method of claim 1, wherein the proxy call is a telephony call.

7. The method of claim 1, wherein at least one of: the proxy call is a POTS call, and the call has a voice channel.

8. The method of claim 1, wherein performance of the work item does not include responding to any of the contact center incoming calls, routed by the call distribution component.

9. The method of claim 1, wherein at least some of the following hold:

(a) a dialer is provided for outputting agent request data for assigning one of the agents to communicate with a called party on a proxy call from the contact center, the agent request data used to obtain the work item related information, (b) a monitor is provided for accessing instances of agent request data that are output by at least one agent requesting system that generates, independent of the call distribution component, the instances for requesting agents, (c) a caller component is provided for performing a step of generating the proxy call to a PBX via a local area network, and (d) an agent server is provided for performing the step of obtaining, wherein the agent server detects the work item related information communicated, via a local area network, to a workstation for the selected agent.

10. The method of claim 9, wherein at least most of (a) through (d) hold.

11. The method of claim 1, further including a step of initiating the proxy call on a local area network, wherein the step of terminating is performed by a component having a different local area network address than the component performing the initiating step.

12. The method of claim 1, wherein for a collection of instances of agent request data obtained from an agent work management system wherein one of the agent request data corresponds to the work item related information, a further step of modifying the collection for indicating that the work item has been assigned to the selected agent.

13. The method of claim 1, wherein the step of terminating terminates the proxy call prior to the selected agent commencing a task for the work item.

14. The method of claim 13, wherein the task includes assigning the selected agent to communicate with a called party.

15. The method of claim 1, further including a step of determining whether a task for the work item can be interrupted so that the selected agent can be connected to incoming calls routed by the call distribution component.

16. The method of claim 1, further including a step of contacting the call distribution component for providing information indicating that the selected agent is available for receiving one or more of the incoming calls work items routed by the call distribution component;

wherein the contacting step is performed after the terminating step.

17. The method of claim 1, further including steps of:

evaluating a constraint related to initiating proxy calls for requesting agents, wherein each of the calls for requesting agents is for assigning one of the agents to perform a task not requiring the agent to respond to any of the incoming calls work items while the agent is performing the task;

wherein the step of evaluating is dependent upon at least one of:

(a) a limit on a number of the proxy calls at a particular time;

(b) a limit on a number of the proxy calls within an elapsed time; and (c) a limit on a proportion of the proxy calls generated for a particular call group.

18. The method of claim 1, further including a step of using a directory number for the proxy call to identify the work item.

19. An apparatus for assigning at least one agent, of a plurality of agents for a contact center, a task to be performed, wherein a call distribution component for the contact center receives a plurality of incoming work items directed to the contact center and routes the incoming work items to selected ones of the plurality of agents according to agent availability, comprising:
   a monitor for obtaining agent request data for assigning some one of the agents to perform a task;
   a caller component for initiating, for the agent request data, a proxy call corresponding to the task to a group of one or more of the agents, wherein the proxy call provides predetermined task related information for performing the task, and wherein the proxy call is not the task;
   an agent workstation for receiving the mom call for a selected one of the agents from the group, wherein the call distribution component selects the selected agent and routes the proxy call to the selected agent;
   wherein the call distribution component uses the predetermined task related information in determining at least the group;
   an agent server for detecting the predetermined task related information from the proxy call;
   identifying, using the predetermined task related information, the task;
   requesting that the call distribution component designate the selected agent as unavailable for taking a subsequent one of the incoming work items; and
   terminating the proxy call prior to the selected agent completing the task.

20. The apparatus of claim 19, wherein the task does not include responding to any of the contact center incoming work items, routed by the call distribution component.

21. The apparatus of claim 20, wherein the task includes one of: responding to an email, reviewing Internet submitted information, interactively corresponding with a customer via an Internet text chat session, participating in agent training, dispatching agents for meetings or employee breaks, preparing agent scripts, activating a data processing application, activating a database retrieval application, and activating a ticket purchase application.

22. An apparatus for assigning at least one agent, of a plurality of agents for a contact center, a task to be performed, wherein a call distribution component for the contact center receives a plurality of incoming work items directed to the contact center and routes the incoming work items to selected ones of the plurality of agents according to agent availability, comprising:
   means for receiving a proxy call at a site for a selected agent, wherein the proxy call relates to assigning a work item to the selected agent, and wherein the proxy call is not the work item;
   wherein the selected agent is selected by the call distribution component from one of the agents of a group of one or more agents, and the call distribution component routes the proxy call to the site;
   means for obtaining from the proxy call, work item related information, wherein the work item related information is used to access at least one of: additional data indicative of the work item, and an application for performing the work item;
   wherein the means for obtaining the work item related information is performed after the selected agent is selected;
   requesting that the call distribution component designate the selected agent as unavailable for taking a subsequent one of the incoming calls;
   providing, to the selected agent, at least one of: the additional data indicative of the work item, and the application for performing the work item; and
   terminating the proxy call prior to the selected agent completing the work item.

23. An apparatus for assigning to at least one agent, of a plurality of agents for a contact center, a work item, wherein a call distribution component for the contact center receives a plurality of work items directed to the contact center and routes the incoming work items to selected ones of the plurality of agents according to agent availability, wherein the apparatus performs at least the following steps:
   detecting agent request data for assigning one of the agents to perform the work item, wherein the agent request data is generated by an agent request generating system, wherein the agent request generating system generates the agent request data without resolving conflicting requests for an agent with at least the call distribution component;
   initializing a proxy call to a predetermined group of one or more agents, wherein the proxy call is initiated in response to detecting the agent request data, and the proxy call has associated therewith work item related information, and wherein the proxy call is not the work item;
   receiving the proxy call at a site for a selected agent;
   wherein the selected agent is selected by the call distribution component from one of the agents of the group;
   after the agent is selected, obtaining from the proxy call, the work item related information, wherein the work item related information is used to access at least one of: additional data indicative of the work item, and an application for performing the work item;
   requesting that the call distribution component designate the selected agent as unavailable for taking a subsequent one of the incoming calls; and
   terminating the proxy call prior to the selected agent completing the work item.

24. The apparatus of claim 23, wherein at least some of the following hold:
   (a) a dialer is provided for outputting agent request data for assigning one of the agents to communicate with a called party on a proxy call from the contact center, the agent request data used to obtain the work item related information,
   (b) a monitor is provided for accessing instances of agent request data that are output by at least one agent requesting system that generates, independent of the call distribution component, the instances for requesting agents,
   (c) a caller component is provided for performing a step of generating the proxy call to a PBX via a local area network, and
   (d) an agent server is provided for performing the step of obtaining, wherein the agent server detects the work item related information communicated, via a local area network, to a workstation for the selected agent.

25. The apparatus of claim 23, wherein a first component for performing the step of initiating the proxy call occurs on a local area network, and the step of terminating is performed by a second component having a different local area network address than the first component.

* * * * *

UNITED STATES PATENT AND TRADEMARK OFFICE
CERTIFICATE OF CORRECTION

PATENT NO. : 7,817,796 B1
APPLICATION NO. : 11/116913
DATED : October 19, 2010
INVENTOR(S) : Joyce A. Clippinger, David C. Mullen and Bridget Rosen

It is certified that error appears in the above-identified patent and that said Letters Patent is hereby corrected as shown below:

At Column 16, line 48, after "incoming" delete "calls" therein.

At Column 17, line 18, delete "mom" and replace with --proxy-- therein.

Signed and Sealed this

Fourteenth Day of December, 2010

David J. Kappos
*Director of the United States Patent and Trademark Office*